United States Patent
Lu et al.

(10) Patent No.: US 9,665,136 B2
(45) Date of Patent: *May 30, 2017

(54) COVER FOR ELECTRONIC DEVICE AND METHOD FOR MANUFACTURING THE SAME

(71) Applicants: INTERFACE OPTOELECTRONIC (SHENZHEN) CO., LTD., Shenzhen (CN); GENERAL INTERFACE SOLUTION LIMITED, Miaoli County (TW)

(72) Inventors: Chien-Chih Lu, Hsinchu (TW); Juin-Ming Wu, Hsinchu (TW); Wei-Cheng Lou, Hsinchu (TW)

(73) Assignees: INTERFACE OPTOELECTRONIC (SHENZHEN) CO., LTD., Shenzhen (CN); GENERAL INTERFACE SOLUTION LIMITED, Miaoli County (TW)

(*) Notice: Subject to any disclaimer, the term of this patent is extended or adjusted under 35 U.S.C. 154(b) by 196 days.

This patent is subject to a terminal disclaimer.

(21) Appl. No.: 14/447,986

(22) Filed: Jul. 31, 2014

(65) Prior Publication Data

US 2015/0036286 A1 Feb. 5, 2015

(30) Foreign Application Priority Data

Aug. 1, 2013 (CN) .......................... 2013 1 03310787

(51) Int. Cl.
*G06F 1/18* (2006.01)
*H04M 1/02* (2006.01)
(Continued)

(52) U.S. Cl.
CPC .............. *G06F 1/182* (2013.01); *B23P 19/04* (2013.01); *B65D 25/54* (2013.01); *C09J 5/00* (2013.01);
(Continued)

(58) Field of Classification Search
CPC .... G06F 1/1637; H04R 1/023; H04M 1/0266; H04M 1/0283; H04M 1/035
See application file for complete search history.

(56) References Cited

U.S. PATENT DOCUMENTS 5,412,162 A * 5/1995 Kindel ................... H04R 1/023
181/150
5,682,290 A * 10/1997 Markow ............... G06F 1/1616
361/679.55
(Continued)

FOREIGN PATENT DOCUMENTS

CN 1231790 10/1999
CN 102227124 A 10/2011
(Continued)

*Primary Examiner* — Adrian S Wilson
(74) *Attorney, Agent, or Firm* — Steven Reiss

(57) ABSTRACT

A cover for an electronic device includes a transparent portion and a non-transparent portion beside the transparent portion. The transparent portion defines a display area of the electronic device. The non-transparent portion defines a non-display area of the electronic device beside the display area. The non-transparent portion includes a transparent substrate integrated with the transparent portion. A plurality of through holes are defined on the transparent substrate.

17 Claims, 25 Drawing Sheets

(51) Int. Cl.
*H04M 1/03* (2006.01)
*G06F 1/16* (2006.01)
*H04R 1/02* (2006.01)
*B23P 19/04* (2006.01)
*B65D 25/54* (2006.01)
*C09J 5/00* (2006.01)
*G06F 1/20* (2006.01)
*C09J 7/02* (2006.01)

(52) U.S. Cl.
CPC .............. *C09J 7/02* (2013.01); *G06F 1/1637* (2013.01); *G06F 1/203* (2013.01); *H04M 1/0266* (2013.01); *H04M 1/0283* (2013.01); *H04M 1/035* (2013.01); *H04R 1/023* (2013.01); *Y10T 29/49826* (2015.01)

(56) References Cited

U.S. PATENT DOCUMENTS

| | | | |
|---|---|---|---|
| 6,504,928 | B1 | 1/2003 | Toyooka |
| 7,467,001 | B2 * | 12/2008 | Wu ................... H04M 1/0266 345/169 |
| 7,778,015 | B2 * | 8/2010 | Weber ................... C25D 11/16 340/815.53 |
| 8,374,378 | B2 * | 2/2013 | Hopkinson ............ H04R 1/023 361/679.01 |
| 2003/0003879 | A1 * | 1/2003 | Saiki ....................... H04M 1/03 455/575.1 |
| 2003/0133070 | A1 * | 7/2003 | Nam ..................... G02F 1/1333 349/158 |
| 2003/0184894 | A1 * | 10/2003 | Bischof ............... H04M 1/0266 359/894 |
| 2006/0061512 | A1 * | 3/2006 | Asano ................... G06F 1/1616 343/702 |
| 2006/0177088 | A1 * | 8/2006 | Howard ................. H04R 1/023 381/391 |
| 2006/0238446 | A1 * | 10/2006 | Takahashi ............. G06F 1/1601 345/55 |
| 2008/0002093 | A1 * | 1/2008 | Kim ..................... G02B 6/0086 349/58 |
| 2008/0024470 | A1 * | 1/2008 | Andre ...................... G09F 9/30 345/204 |
| 2008/0158173 | A1 * | 7/2008 | Hamblin ............... G06F 1/1626 345/173 |
| 2008/0298627 | A1 * | 12/2008 | Bonebright ............. H04M 1/03 381/386 |
| 2009/0040790 | A1 * | 2/2009 | Payne ................... G06F 1/1616 362/632 |
| 2009/0122475 | A1 * | 5/2009 | Kim ................... G02F 1/133308 361/679.21 |
| 2010/0092022 | A1 * | 4/2010 | Hopkinson ............ H04R 1/023 381/391 |
| 2011/0096477 | A1 * | 4/2011 | Wang ................... H04M 1/0266 361/679.01 |
| 2012/0071217 | A1 * | 3/2012 | Park ........................ A45C 11/00 455/575.8 |
| 2012/0134518 | A1 * | 5/2012 | Otani ..................... H04R 1/023 381/189 |
| 2012/0243719 | A1 * | 9/2012 | Franklin ............... G06F 1/1652 381/333 |
| 2012/0268881 | A1 * | 10/2012 | Bergeron ................ B29C 63/02 361/679.26 |
| 2012/0299841 | A1 * | 11/2012 | Tang ..................... H01Q 1/1271 345/173 |
| 2013/0182379 | A1 * | 7/2013 | Kim ................... H04M 1/0283 361/679.01 |
| 2013/0223667 | A1 * | 8/2013 | Kim ..................... H04R 1/2842 381/333 |
| 2015/0036286 | A1 * | 2/2015 | Lu .......................... B23P 19/04 361/679.46 |
| 2015/0036845 | A1 * | 2/2015 | Lu .......................... H04R 1/02 381/189 |
| 2015/0146905 | A1 * | 5/2015 | Abe ........................ H04R 1/086 381/334 |

FOREIGN PATENT DOCUMENTS

| | | |
|---|---|---|
| CN | 102387454 A | 3/2012 |
| CN | 102448260 A | 5/2012 |

* cited by examiner

COVER FOR ELECTRONIC DEVICE AND METHOD FOR MANUFACTURING THE SAME

CROSS-REFERENCE TO RELATED APPLICATIONS

This application claims priority to Chinese Patent Application No. 201310331078.7 filed on Aug. 1, 2013 in the Chinese Intellectual Property Office, the contents of which are incorporated by reference herein.

FIELD

Embodiments of the present disclosure generally relate to an electronic device, and more particularly, to a cover structure of an electronic device.

BACKGROUND

Covers of electronic devices such as smart phones and tablet computers usually include a plurality of through holes to transmit signals such as sound, infrared rays, and lights.

BRIEF DESCRIPTION OF THE DRAWINGS

Implementations of the present technology will now be described, by way of example only, with reference to the attached figures.

DETAILED DESCRIPTION

Figure 1:
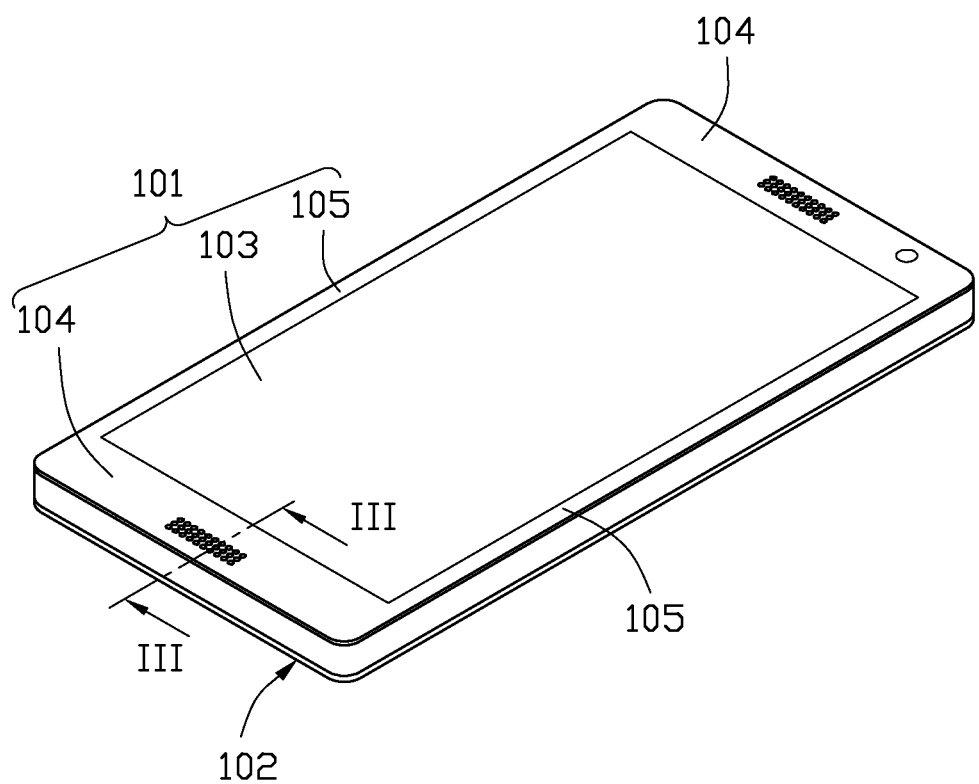
FIG. 1 is an isometric view of an electronic device according to a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "coupled" is defined as connected, whether directly or indirectly through intervening components, and is not necessarily limited to physical connections. The connection can be such that the objects are permanently connected or releasably connected.

The present disclosure is described in relation to a cover used in an electronic device.

FIG. 1 illustrates an isometric view of an electronic device 10 according to a first embodiment. In this embodiment, the electronic device 10 can be a smart phone, a tablet computer, a media player, or other device the like. Preferably, the electronic device 10 is a smart phone. The electronic device 10 defines a display surface 101 and a back surface 102 opposite to the display surface 101. The display surface 101 includes a substantially rectangular display area 103, two first border areas 104 located at two opposite ends of the display area 103, and two second border areas 105 located at two opposite sides of the display area 103. Each second border area 105 is coupled between the two first border areas 104. Thus, the display area 103 is surrounded by the two first border areas 104 and the two second border areas 105.

Figure 2:
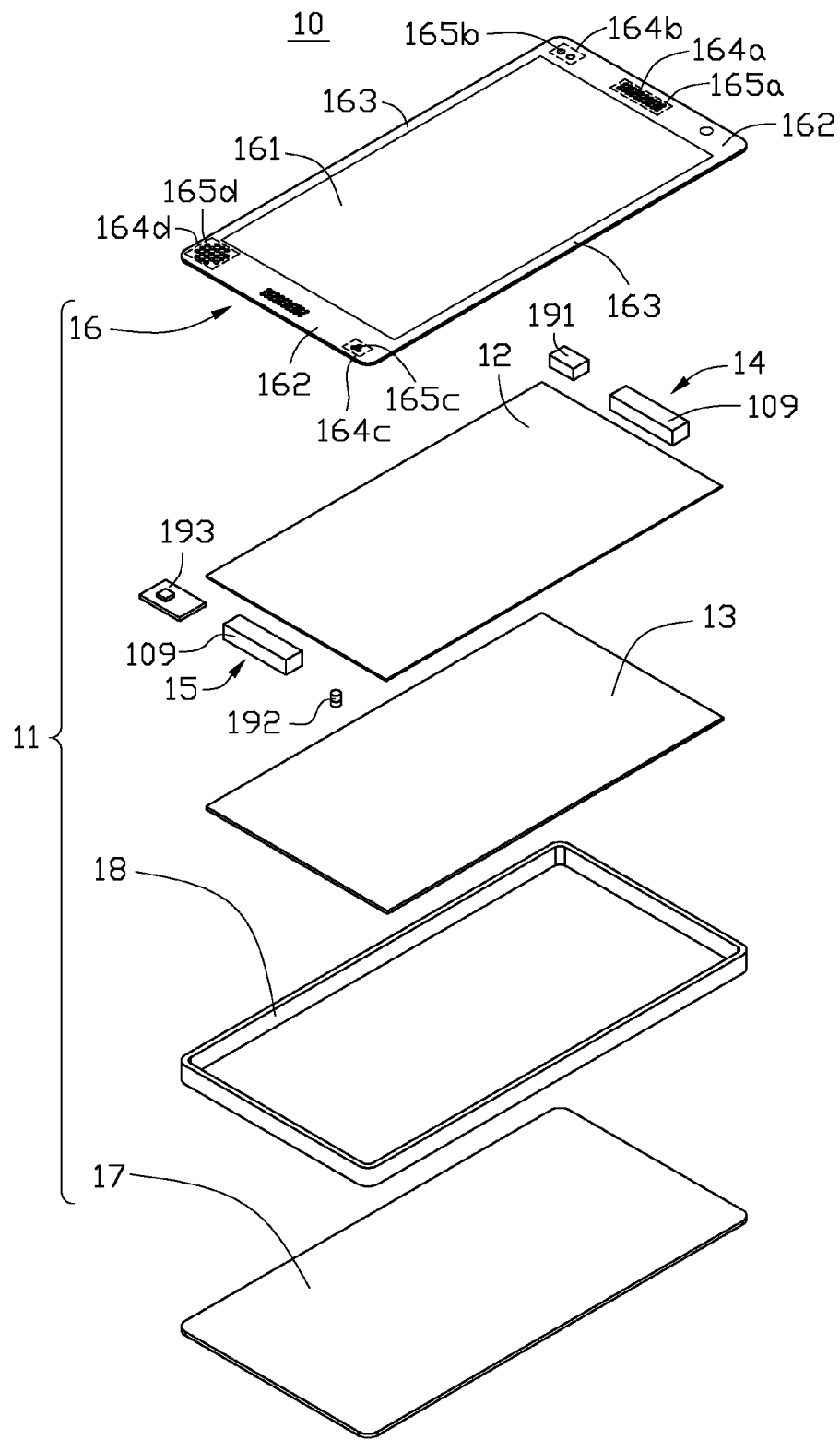
FIG. 2 is an exploded view of the electronic device of FIG. 1.

FIG. 2 illustrates an exploded view of the electronic device 10 of FIG. 1. The electronic device 10 includes an enclosure 11, a touch sensing structure 12, a display panel 13, a first speaker 14, and a second speaker 15, an infrared module 191, a microphone 192, and a circuit board 193. The enclosure 11 includes a first cover 16, a second cover 17, and a third cover 18. The first cover 16 can be a cover lens or a cover glass of the electronic device 10 on which the display surface 101 is defined.

The first cover 16 includes a main portion 161, two first border portions 162 at two opposite sides of the main portion 161, and two second border portions 163 at another two opposite sides of the main portion 161. The two second border portions 163 are coupled to ends of the two first border portions 162. The main portion 161 is defined as the display area 103, while the two first border portions 162 are defined as the two first border areas 104 and the two second border portions 163 are defined as the two second border areas 105. Each first border portion 162 includes at least one hole area 164 (for example, 164a, 164b, 164c, 164d) defining a plurality of through holes 165 (for example, 165a, 165b, 165c, 165d). It is understood that, in other embodiments, the first border portion 162 can include one or more hole areas 164.

In at least one embodiment, the hole area 164a is located at a center of the first border portion 162. The through holes 165a within the hole area 164a are substantially circular and densely distributed in the hole area 164a. The hole area 164b is located at a upper-left side of the main portion 161 and two through holes 165b are defined in the hole area 164b. The hole area 164c is located at a bottom-right side of the main portion 161 and a plurality of through holes 165c are defined in the hole area 164c to form a triangle pattern. The hole area 164d is located at a bottom-left side of the main portion 161 and a plurality of through holes 165d are densely distributed within the hole area 164d. In at least one embodiment, the term "densely distributed" refers to that a distance between each two adjacent through holes 165 is less than a predetermined distance. In one example, the predetermined distance can be three times of the diameter of the through hole 165. The through holes 165 can be regularly arranged in one or more rows.

The touch sensing structure 12 is located under the first cover 16 at least corresponding to the main portion 161. The size of the touch sensing structure 12 is slightly greater than the size of the main portion 161. The first speaker 14 and the second speaker 15 are respectively located near an upper side and a bottom side of the touch sensing structure 12 to correspond to the through holes 165a of the two first border portions 162. Each of the first speaker 14 and the second speaker 15 defines a sound output surface 109 to output sound.

The sound output surface 109 of the first speaker 14 is located to correspond to the through holes 165a near the upper sides of the main portion 161. The first speaker 14 can work in a loudspeaker mode to output sound to the external environment via the through holes 165a and can work in a headset mode to serve as a headset of the electronic device 10. When the first speaker 14 works at the headset mode, the sound output by the speaker 14 can be heard only when the electronic device 10 is put near an ear. It is understood that, the first speaker 14 can be manually or automatically switched between the loudspeaker mode and the headset mode. Generally, a driving current applied to the first speaker 14 while the first speaker 14 is working at the loudspeaker mode is greater than a driving current applied to the first speaker 14 while the first speaker 14 is working at the headset mode.

The second speaker 15 is similar to the first speaker 14, except that the sound output surface 109 of the second speaker 15 is located to correspond to the through holes 165a near the bottom side of the main portion 161.

The infrared module 191 is located at the upper-left side of the touch sensing structure 12 to correspond to the through holes 165b. The infrared module 191 can receive or emit infrared rays via the through holes 165b.

The microphone 192 is located at the bottom-right side of the touch sensing structure 12 to correspond to the through holes 165c, to receive external sound via the through holes 165c. In at least one exemplary embodiment, only one through hole 165c is defined in the hole area 164c.

The circuit board 193 is located to correspond to the through holes 165d to dissipate heats produced by the circuit board 193 out of the enclosure 11.

The display panel 13 is located under the touch sensing structure 12. The second cover 17 is located under the display panel 13. The second cover 17 and the third cover 18 cooperatively form a receiving space to receive the touch sensing structure 12, the display panel 13, the first speaker 14, and the second speaker 15.

Figure 3:
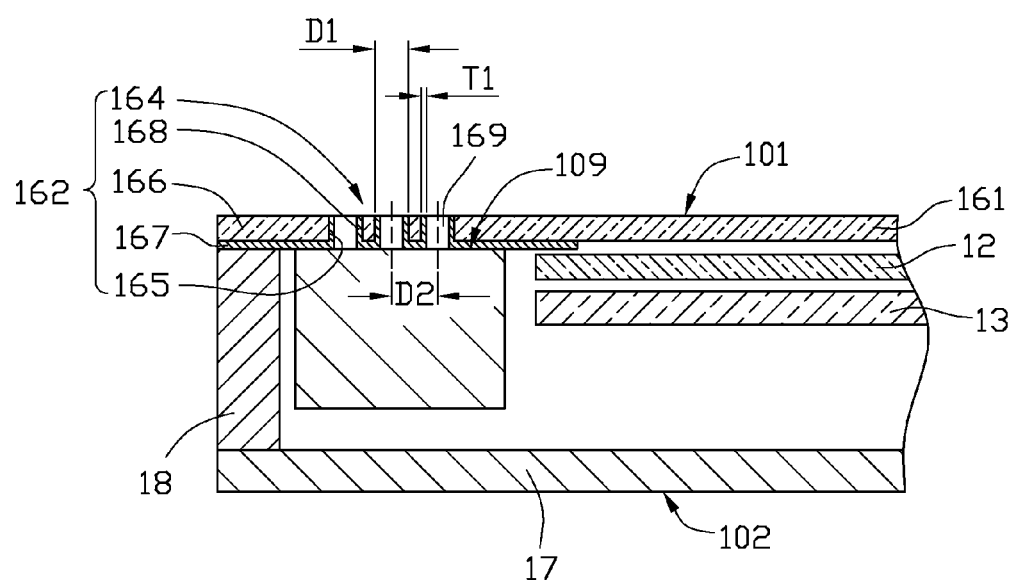
FIG. 3 is a cross-sectional view of FIG. 1 taken along line III-III.

FIG. 3 illustrates a cross-sectional view of FIG. 1 taken along line III-III. The first border portion 162 includes a substrate 166 integrated with the main portion 161 by an insert molding or an injection molding. Further, in this embodiment, the second border portions 163 are also integrated with the main portion 161. Therefore, it is not required to connect the first border portions 162 and the second border portions 163 to the main portion 161 using glues or other connecting materials or structures.

In one embodiment, the main portion 161 and the substrate 166 of the first border portion 162 can be made of the same material, such as a transparent material. In other embodiments, the main portion 161 and the substrate 166 can be made of different materials, such as the main portion 161 is made of a transparent material while the substrate 166 of the first border portion 162 is made of a translucent or non-transparent material. Some non-limiting examples of transparent materials include glass, sapphire materials, transparent resins, and plastics. Preferably, the two first border portions 162 are non-transparent while the substrate 166 is transparent.

The plurality of through holes 165 are respectively formed in the substrate 166 and correspond to the first speaker 14, the second speaker 15, the infrared module 191, the microphone 192, and the circuit board 193. The sound output surface 109 corresponds to the through holes 165c. A distance between the sound output surface 109 and the first border portion 162 is in a predetermined value range such as 0-2 millimeters. Preferably, the sound output surface 109 abuts against an inner surface of the first border portion 162. Thus, no space is between the sound output surface 109 and the first border portion 162. The through holes 165 can be formed using a laser device.

Each of the first border portion 162 and the second border portion 163 includes a shielding layer 167 attached to the substrate 166 and an adhesive layer 168 adhered to an inner wall of each through hole 165. The shielding layer 167 can be made of an ink material to shield electronic components of the electronic device 10 within the first border areas 104 and the second border areas 105. In this embodiment, the color of the ink material can be black. In other embodiments, the color of the ink can be white, red, green, blue, yellow, or others. It is understood that, the adhesive layer 168 can be attached to only a portion of the through holes 165 rather than all of the through holes 165.

The adhesive layer 168 is configured to adjust a visibility of the through holes 165. For example, when the adhesive layer 168 has the same color as the shield layer 167, the adhesive layer 168 can decrease the visibility of the through holes 15 to make the through holes 165 hidden. When the adhesive layer 168 has the different color from the shield layer 167, the adhesive layer 168 can increase the visibility of the through holes 165 to make the through holes 165 to form a predetermined pattern, such as a logo. In this embodiment, the color of the adhesive layer 168 is the same or similar to the color of the hole area 164 to make the through holes 165 look hidden. In at least one example, if the substrate 166 of the first border portion 162 is transparent, the color of the hole area 164 looks to be the same as the color of the shielding layer 167. Under this condition, the color of the adhesive layer 168 can be the same as the color of the shielding layer 167.

The adhesive layer 168 can be formed by an ink jetting method. In other embodiments, the adhesive layer 168 can be formed by a coating method or a print method. In one example, adhesive material is filled into each of the through holes 165. Then, some of the adhesive material in the through holes 165 can be removed using a drilling apparatus to form the sound transmission hole 169. The drilling apparatus can be a laser apparatus. In at least one embodiment, the shielding layer 167 and the adhesive layer 168 can be made of the same material (for example, black inks) in a same manufacturing process. In one example, adhesive material such as ink can be formed on a surface of the substrate 166 and filled into each of the through holes 165 using the print method or the coating method. After the adhesive material becomes consolidated, some of the consolidated adhesive material within each of the through holes 165 is removed to form the adhesive layer 168 within each through hole. At the same time, unwanted consolidated adhesive material is removed from the substrate 166 to form the shielding layer 167.

In this embodiment, each of the through holes 165a has a same dimension. The diameter D1 of each through hole 165c can be 0.1 millimeter to 1 millimeter. A distance D2 between centers of each two adjacent through holes 165a is greater than or equal to the diameter D1. For example, the distance D2 can be 0.2 millimeters to 2 millimeters. Preferably, the diameter D1 of each through hole 165c is 0.3 millimeters while the distance D2 between each two adjacent through holes 165a is 0.5 millimeters. It is understood that, a thickness of the adhesive layer 168 is less than a radius of the through hole 165 to avoid the through holes 16 being fully filled by the adhesive layer 168. Thus, the adhesive layer 168 is adhered to the inner wall of the through hole 168, whit forming a sound transmission hole 169 centered at the through hole 165. Thus, the sound output from the first speaker 14 and the second speaker 15 can be transmitted outside of the first cover 16 of the electronic device 10 through the sound transmission hole 169. In this embodiment, the thickness of the adhesive layer 168 can be 0.01 millimeters to 0.45 millimeters. Preferably, the thickness of the adhesive layer 168 is 0.05 millimeters.

The through holes 165b can be also circular. A diameter the through hole 165b can be slightly greater than the diameter of the through hole 165a. For example, the through hole 165b can be 0.1 millimeter to 3 millimeters. Preferably, the diameter of the through hole 165b can be 2 millimeters, and a distance between centers of two adjacent through holes 165b is greater than the diameter of the through hole 165b. In at least one embodiment, the thickness of the adhesive layer 168 is less than a radius of the through hole 165b to allow infrared rays to pass through the through holes 165b. In other embodiment, the adhesive layer 168 can be filled into the through hole 165b if the adhesive layer 168 is made of material which allow infrared rays to pass therethrough.

The through holes 165c corresponding to the microphone 192 can also be circular and have a diameter of 0.01 millimeter to 2 millimeters. A distance between centers of each two adjacent through holes 165c can be 0.2 to 2 millimeters. In at least one example, the diameter of the through hole 165c is 0.5 millimeters, and the distance between each two adjacent through holes 165c is 0.8 millimeters. It is understood that, the thickness of the adhesive layer 168 is less than a radius of the through hole 165c.

The through holes 165d can also be circular and can have a greater diameter than that of the through holes 165c. For example, the diameter of the through hole 165d can be 0.5 millimeters to 5 millimeters. A distance between centers of each two adjacent through holes 165d can be also 0.5 millimeters to 5 millimeters. In at least one example, the diameter of the through hole 165d is 1.5 millimeters, while the distance between the centers of each two adjacent through holes 165d is 2 millimeters. It is understood that, the thickness of the adhesive layer 168 is less than a radius of the through hole 165d.

The touch sensing structure 12 can be a capacitive touch panel to sense touch operations. In at least one embodiment, the display panel 13 can be a liquid crystal display (LCD) panel or an organic light emitting diode (OLED) panel. It is understood that, the electronic device 10 can further include a backlight module (not shown) under the display panel 13 when the display panel 13 is the LCD panel.

The second cover 17 is located opposite to the first cover 16 to serve as a back cover of the electronic device 10. The third cover 18 is substantially a hollow and rectangular frame coupled between the first cover 16 and the second cover 17. The first cover 16, the second cover 17, and the third cover 18 cooperatively form the receiving space to receive the touch sensing structure 12 and the display panel 13 therein.

Figure 4:
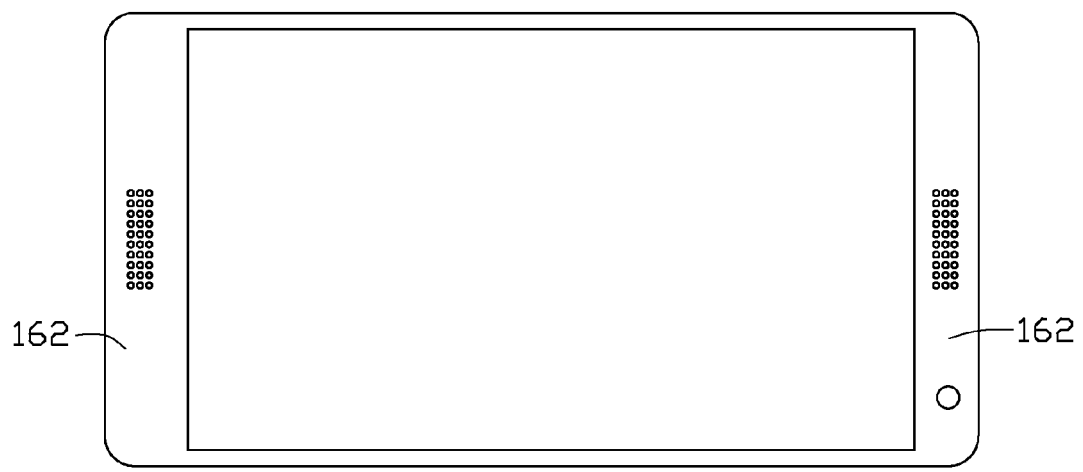
FIG. 4 is a plan view of the electronic device of FIG. 1.

FIG. 4 illustrates that the electronic device 10 is transversely placed to play sound via the first speaker 14 and the second speaker 15. The first speaker 14 and the second speaker 15 are respectively located at the left side and the right side. When both the first speaker 14 and the second speaker 15 are working in the loudspeaker mode, one of the first speaker 14 and the second speaker 15 can be configured to output left channel audio while the other of the first speaker 14 and the second speaker 15 be configured to output right channel audio, so that a stereo sound effect is provided.

As described above, the plurality of through holes 165 are defined in the first cover 16 to correspond to the first speaker 14 and the second speaker 15. Thus, the decoration mesh for the first speaker 14 and the second speaker 15 can be omitted. Further, the adhesive layer 168 adhered to the inner wall of the through holes 165 can make the through holes 165 look hidden. Thus, the appearance of the electronic device 10 looks more appealing.

Figure 5:
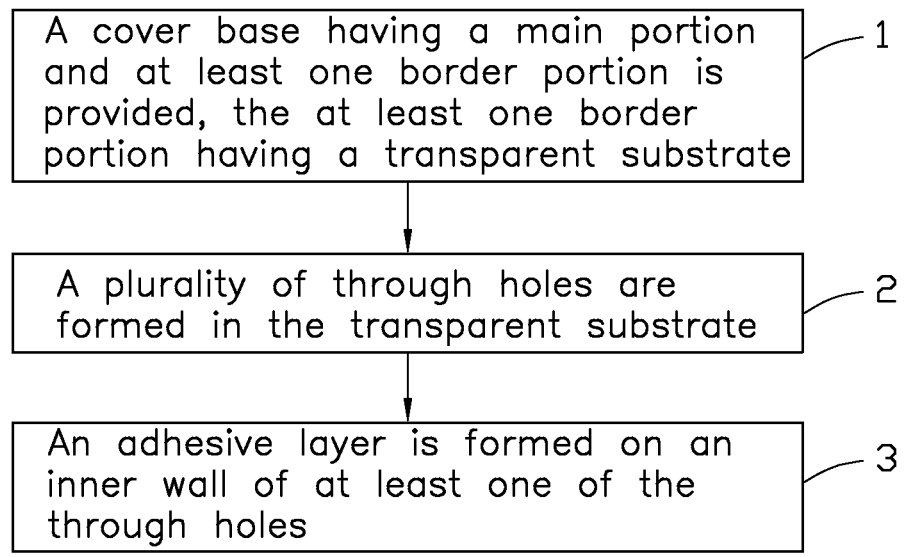
FIG. 5 is a flowchart of manufacturing a cover of the electronic device of FIG. 1

FIG. 5 illustrates a flowchart of a method for manufacturing the first cover 16 of the electronic device 10. The method can begin at block 1. At block 1, a cover base having a main portion and at least one border portion is provided, the at least one border portion having a transparent substrate. At block 2, a plurality of through holes are formed in the transparent substrate. At block 3, an adhesive layer is formed on an inner wall of at least one of the through holes.

In at least one embodiment, the transparent substrate can be a glass substrate, a sapphire substrate, a transparent resin substrate, or a plastic substrate. The plurality of through holes can be formed using a laser device. The adhesive layer can be formed using a jetting method, a print method, or a coating method. In at least one example, forming the adhesive layer can include filling adhesive material into the at least one of the through holes and removing a portion of the adhesive material from the at least one of the through holes.

The method can further include forming a shielding layer on a surface of the transparent substrate. In at least one embodiment, the shielding layer can have the same color as the adhesive layer. Thus, the shielding layer and the adhesive layer can be formed using the same material in a same manufacturing process. In other embodiments, the shielding layer can have the different color from the adhesive layer. The structure and material of the transparent substrate, the adhesive layer and the shielding layer can be respectively the same to the transparent 166, the adhesive layer 168, and the shielding layer 167 as described above.

Figure 6:
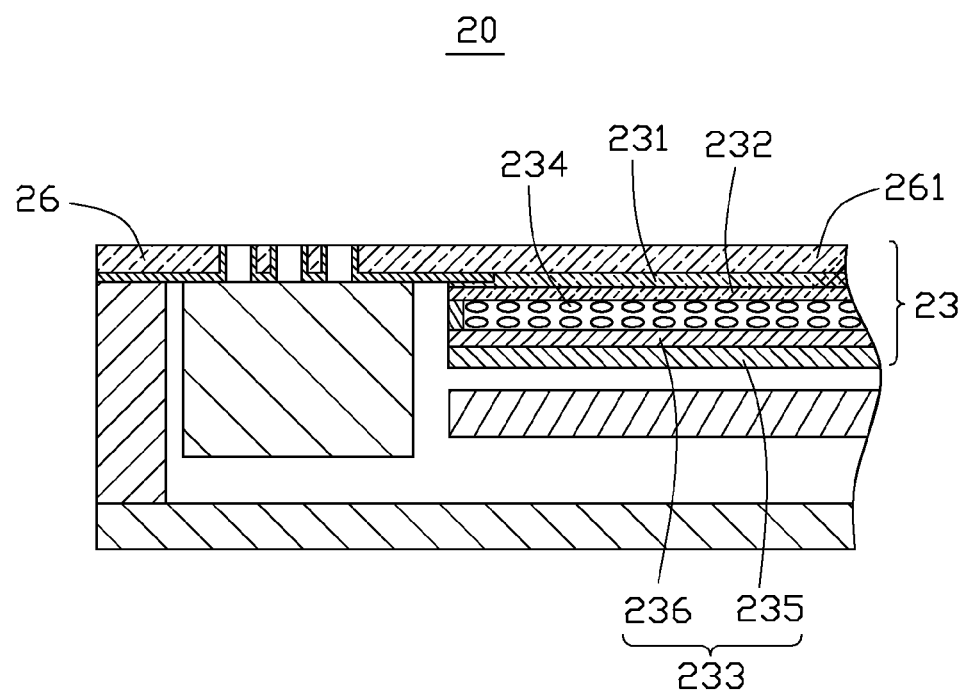
FIG. 6 is a cross-sectional view of an electronic device according to a second embodiment.

FIG. 6 illustrates a cross-sectional view of an electronic device 20 according to a second embodiment. The electronic device 20 in the second embodiment is similar to the electronic device 10 in the first embodiment. The electronic device 20 includes a first cover 26 and a display panel 23. In the second embodiment, the first cover 26 has the same structure with the first cover 16 in the first embodiment, and also serves as an upper substrate of the display panel 23. The display panel 23 includes a color filter 231 and a first driving electrode layer 232 formed on an inner side of the first cover 26. The display panel 23 further includes a lower substrate assembly 233 and a liquid crystal layer 234 sandwiched between the first cover 26 and the lower substrate assembly 233. The lower substrate assembly 233 can include a lower substrate 235 and a second driving electrode layer 236 formed on the substrate 235. The first driving electrode layer 232 and the second driving electrode layer 236 cooperatively drive the display panel to display and sense touch operations applied on the first cover 26.

In this second embodiment, since the first cover 26 serves as an upper substrate, a substrate for the display panel 23 can be omitted. Thus, the thickness of the electronic device 20 can be decreased.

Figure 7:
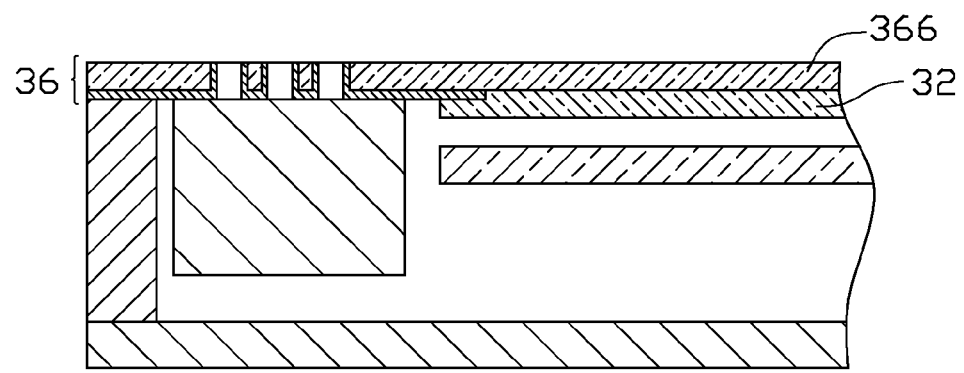
FIG. 7 is a cross-sectional view of an electronic device according to a third embodiment.

FIG. 7 illustrates a cross-sectional view of an electronic device 30 according to a third embodiment. The electronic device 30 is similar to the electronic device 10 in the first embodiment, except that a touch sensing structure 32 of the electronic device 30 is formed on a substrate 366 of the first cover 36. Thus, an independent substrate for the touch sensing structure 32 can be omitted to decrease the thickness of the electronic device 30.

Figure 8:
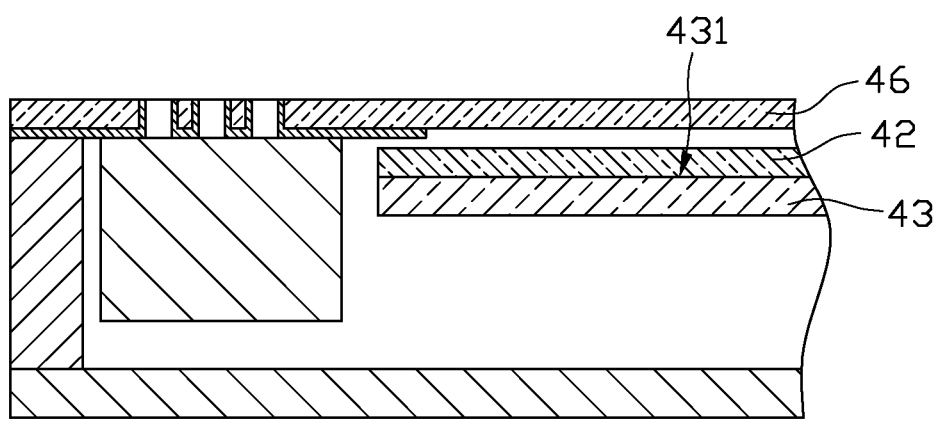
FIG. 8 is a cross-sectional view of an electronic device according to a fourth embodiment.

FIG. 8 illustrates a cross-sectional view of an electronic device 40 according to a fourth embodiment. In the fourth embodiment, the electronic device 40 is similar to the electronic device 10 in the first embodiment, except that a touch sensing structure 42 of the electronic device 40 is formed on an upper surface 431 of the display panel 43. Thus, an independent substrate for the touch sensing structure 42 can be omitted to decrease the thickness of the electronic device 40.

Figure 9:
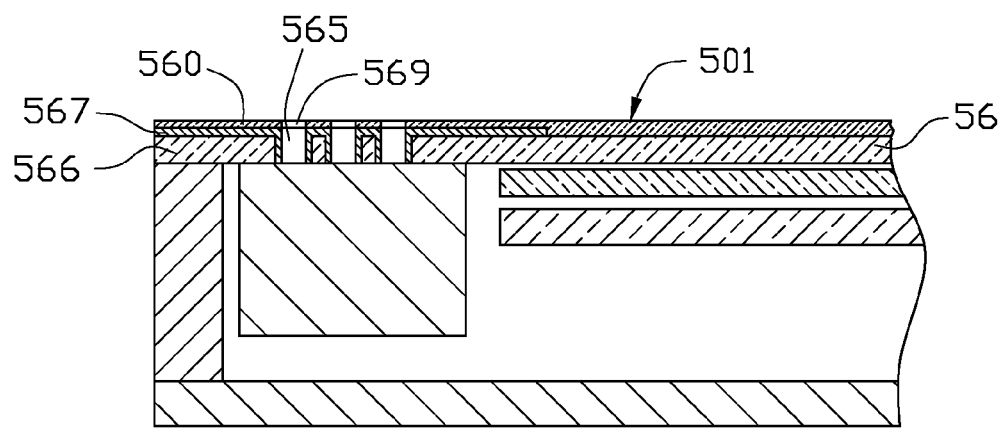
FIG. 9 is a cross-sectional view of an electronic device according to a fifth embodiment.

FIG. 9 illustrates a cross-sectional view of an electronic device 50 according to a fifth embodiment. The electronic device 50 is similar to the electronic device 10 in the first embodiment. In the fifth embodiment, a first cover 56 has the similar structure with the first cover 16 of the first embodiment except that a shielding layer 567 is located on an upper surface of a substrate 566 of a first border portion (not labeled) of the first cover 56. A covering layer 560 is formed on the shielding layer 567 to protect the shielding layer 567 and to make a display surface 501 of the electronic device 50 smooth. The covering layer 560 can be made of isolating material and anti-reflection material. The covering layer 560 defines a plurality of substantially circular openings 569 corresponding to through holes 565 defined on the substrate 566 of the first border portion of the first cover 56.

Figure 10:
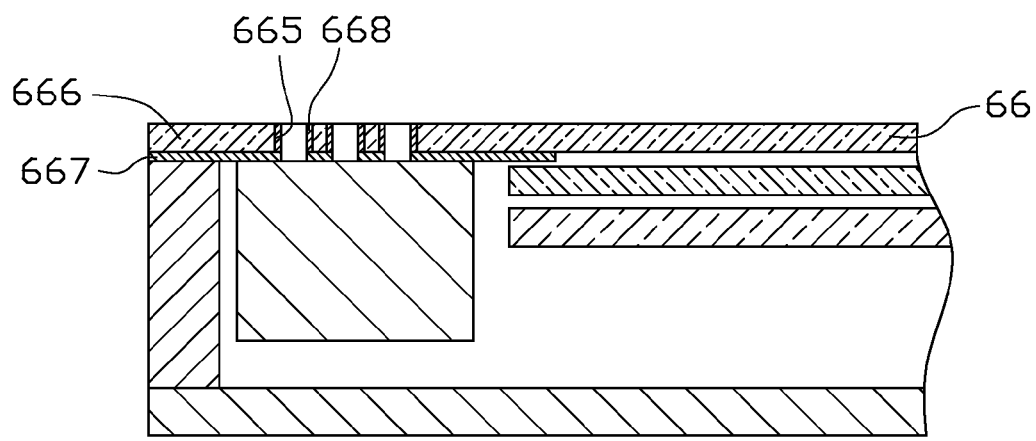
FIG. 10 is a cross-sectional view of an electronic device according to a sixth embodiment.

FIG. 10 illustrates a cross-sectional view of an electronic device 60 according to a sixth embodiment. The electronic device 60 is similar to the electronic device 10 in the first embodiment. In the sixth embodiment, a first cover 66 has the similar structure with the first cover 16 of the first embodiment except that a shielding layer 667 and an adhesive layer 668 of the first cover 66 are formed in different manufacturing processes. For example, the adhesive layer 668 is first formed by jetting ink to the inner surface of through holes 665 of the first cover 66 to form the adhesive layer 668. Then, a layer of shielding materials are printed or coated on a substrate 666 of a first border portion (not labeled) of the first cover 66 to form the shielding layer 667. It is understood that, the order of forming the shielding layer 667 and the adhesive layer 668 can be changed. That is, the shielding layer 667 can also be formed before the adhesive layer 668 is formed.

Figure 11:
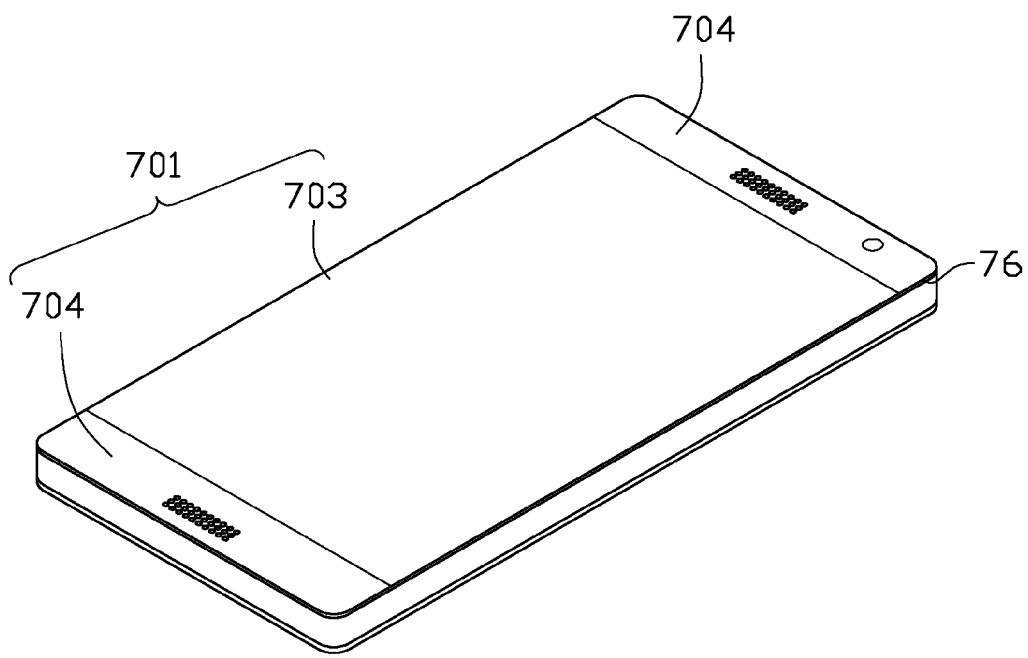
FIG. 11 is an isometric view of an electronic device according to a seventh embodiment.
Figure 12:
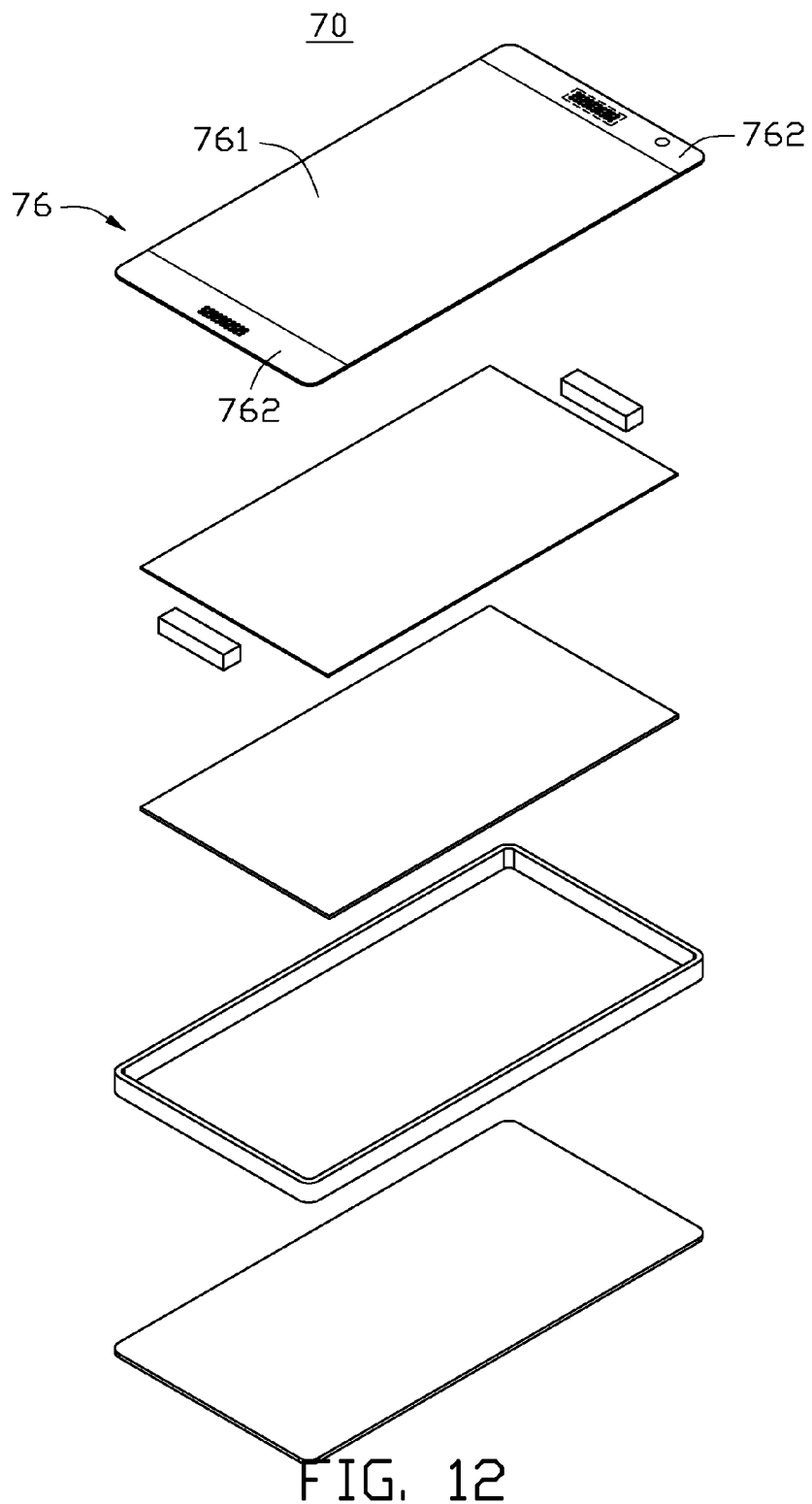
FIG. 12 is an exploded view of the electronic device of FIG. 10.

Referring to FIGS. 11-12, FIG. 11 illustrates an isometric and schematic view of an electronic device 70 according to a seventh embodiment, and FIG. 12 is an exploded view of the electronic device 70 of FIG. 11. The electronic device 70 is similar to the electronic device 10 in the first embodiment, except that the electronic device 70 does not have border areas at two opposite sides (for example, right side and left side). A display surface 701 of the electronic device 70 includes a display area 703 and two border areas 704 located at two opposite ends (for example, bottom end and upper end) of the display surface 701.

Figure 13:
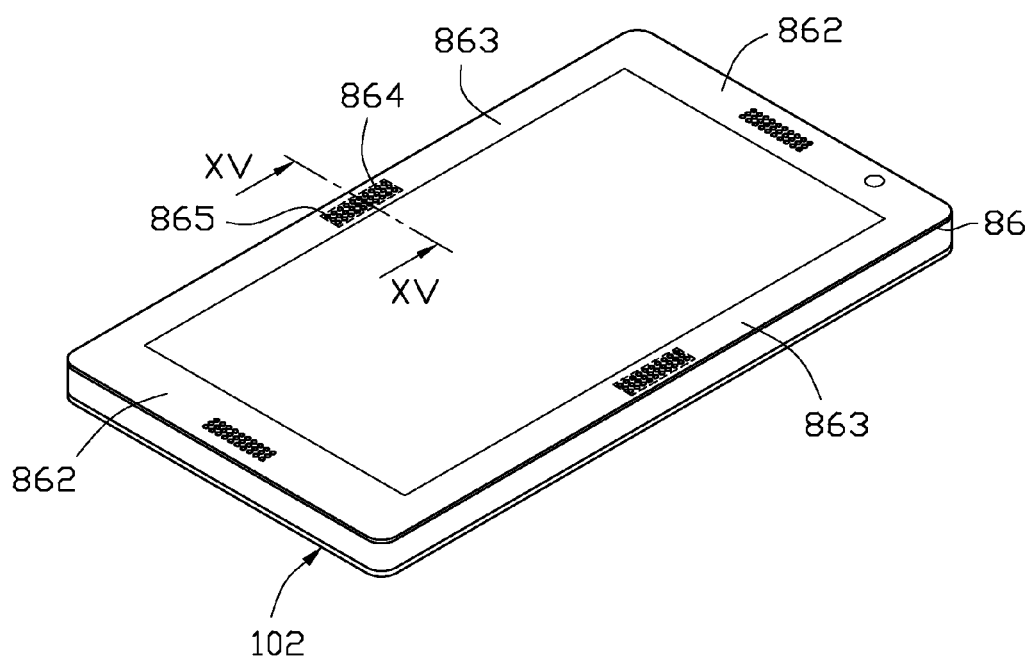
FIG. 13 is an isometric view of an electronic device according to a eighth embodiment.
Figure 14:
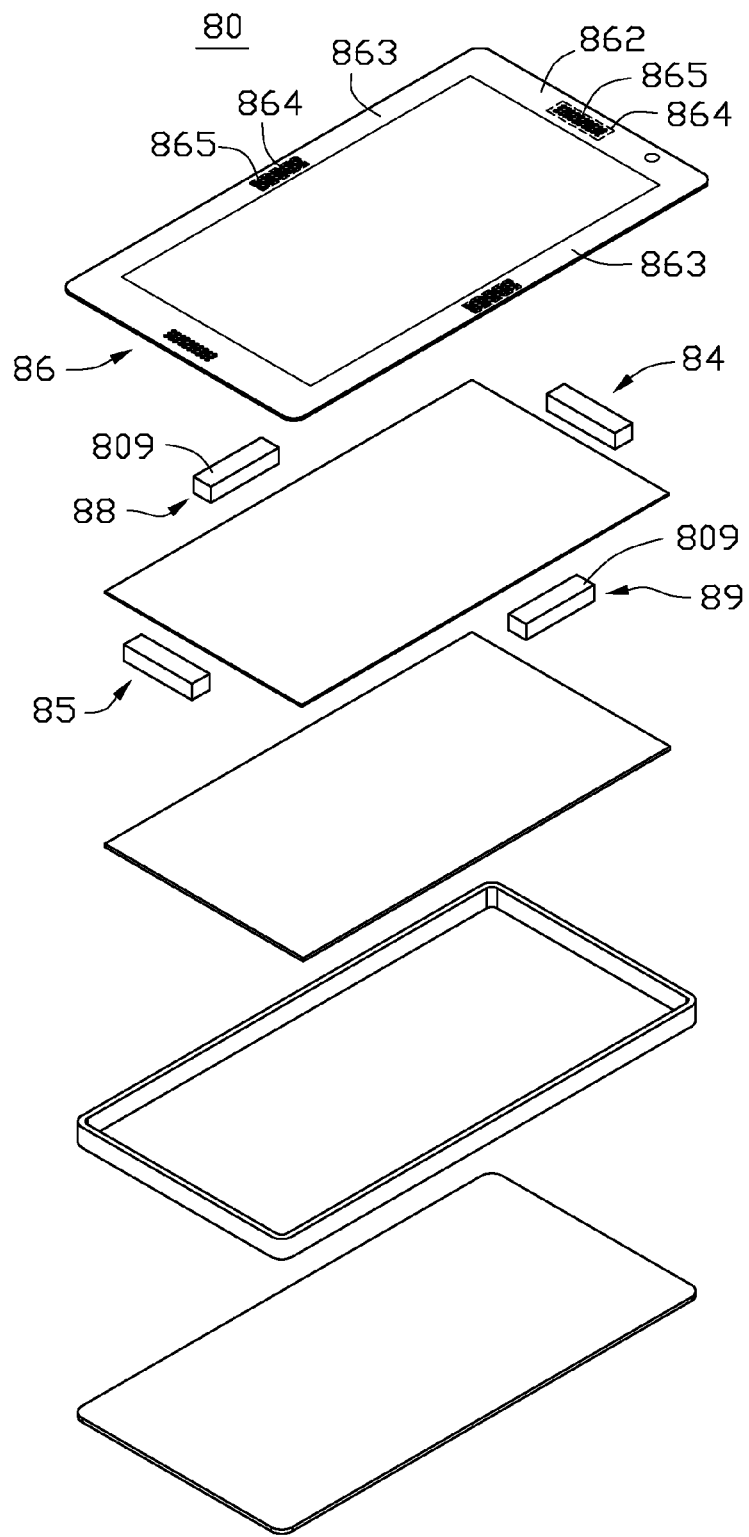
FIG. 14 is an exploded view of the electronic device of FIG. 13.

Referring to FIG. 13-14, FIG. 13 is an isometric view of an electronic device 80 according to an eighth embodiment, and FIG. 14 is an exploded view of the electronic device 80 of FIG. 13. The electronic device 80 is similar to the first electronic device 10 in the first embodiment, except that the electronic device 80 further includes a third speaker 88 and a fourth speaker 89. The third speaker 88 and the fourth speaker 89 are respectively located near a left side and a right side of a touch sensing structure 82. Thus, the first, second, third, and fourth speakers 84, 85, 88, 89 are respectively located near four sides of the touch sensing structure 82. Consequently, two second border portions 863 of a first cover 86 each includes a hole area 864 defining a plurality of through holes 865 to transmit the sound output from the third and fourth speakers 88, 89 out of the first cover 86.

Figure 15:
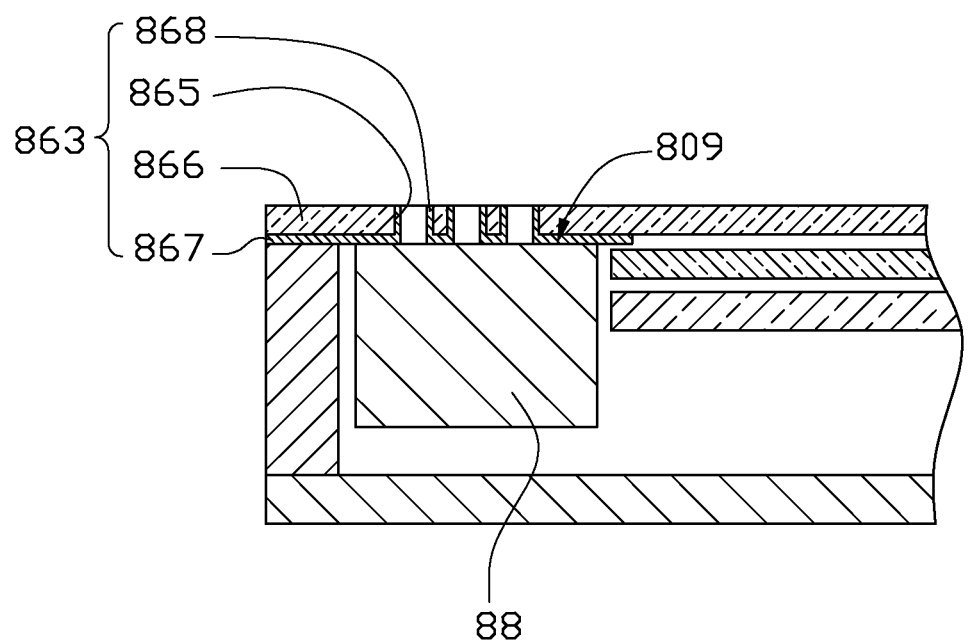
FIG. 15 is a cross-sectional view of FIG. 13 taken along line XV-XV.

FIG. 15 illustrates a cross-sectional view of FIG. 13 taken along line IX-IX. In the eighth embodiment, a second border portion 863 has the same structure with a first border portion 862 of an electronic device 80. The second border portion 863 includes a shielding layer 867 and an adhesive layer 868. Each of the third speaker 88 and the fourth speaker 89 includes a sound output surface 809 corresponding to the through holes 865. A distance between the sound output surface 809 and the second border portion 863 is in a predetermined value range such as 0-2 millimeters. Preferably, as shown in FIG. 15, the sound output surface 809 abuts against an inner surface of the second border portion 863.

Figure 16:
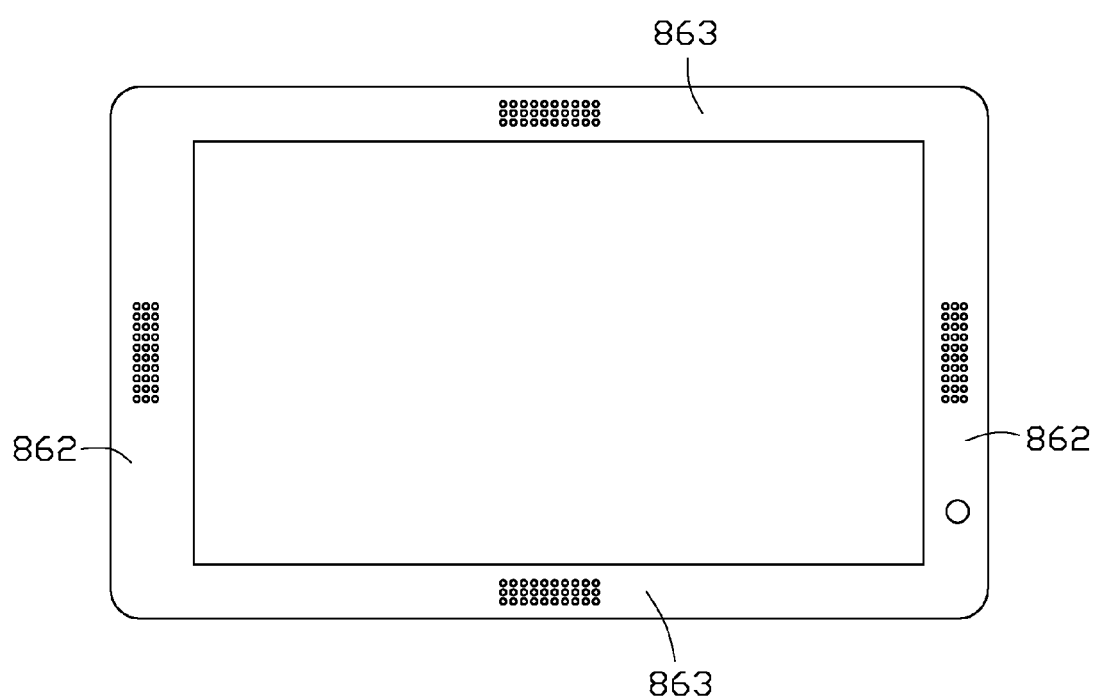
FIG. 16 is a plan view of the electronic device of FIG. 12.

FIG. 16 illustrates that the electronic device 80 is transversely placed to play sound via the first, second, third, and fourth speakers 84, 85, 88, 89. Each of the first, second, third, and fourth speakers 84, 85, 88, 89 can work in the loudspeaker mode to output different audio to the external environment. The first speaker 84 can be configured to output left channel audio, the second speaker 85 can be configured to output right channel audio, and both the third speaker 88 and the fourth speaker 89 can be configured to output center channel audio. That is, the first speaker 84 serves as a left channel speaker, the second speaker 89 serves as a right channel speaker, and the third and fourth speakers 88, 89 serve as center channel speakers. In at least one embodiment, a frequency of the center channel audio is less than a frequency of the left and right channel audio. In one example, when the electronic device 80 is used to play movies, the third and fourth speakers 88, 89 can be used to play center channel audio having a frequency less than 80 Hz to enhance human voices in the movies. It is understood that, the third and fourth speakers 88, 89 can respectively serve as the left channel speaker and the right channel speaker while the first and second speaker 84, 85 serve as the center channel speaker.

Figure 17:
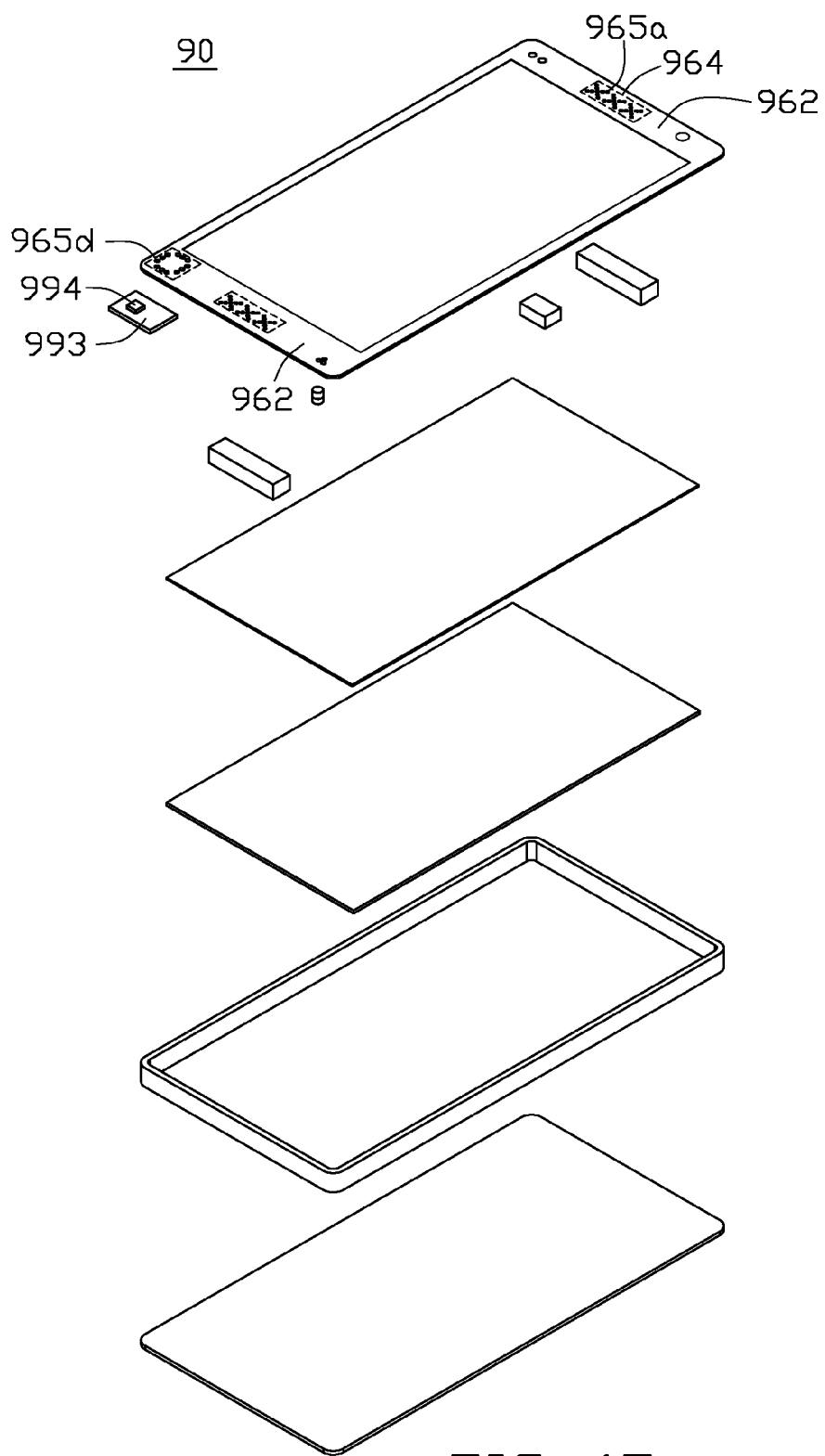
FIG. 17 is an exploded view of an electronic device according to a ninth embodiment
Figure 18:
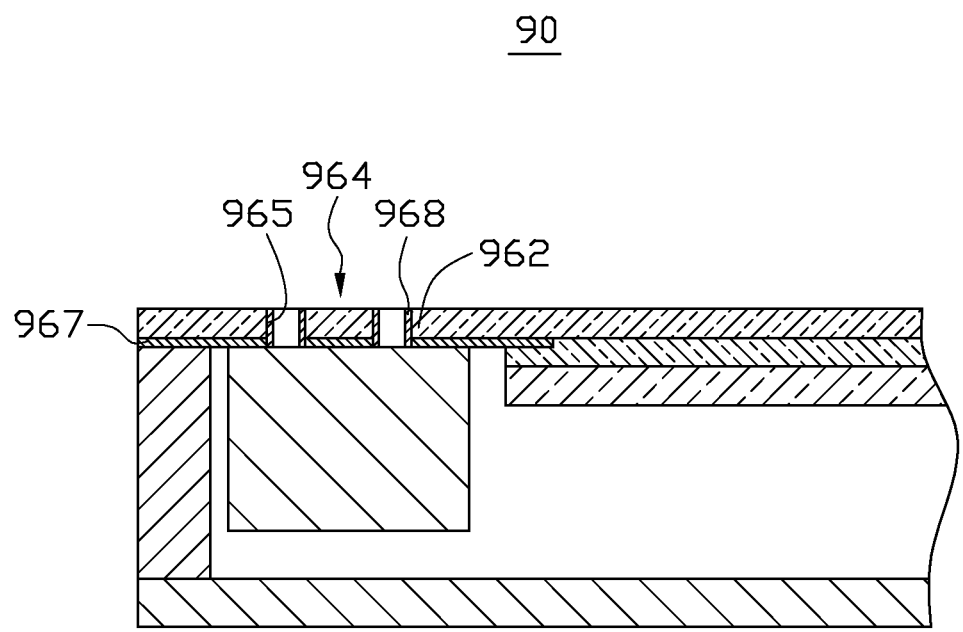
FIG. 18 is a cross-sectional view of the electronic device of FIG. 17.

Referring to FIG. 17-18, FIG. 17 is an exploded view of an electronic device 90 according to a ninth embodiment, and FIG. 18 is a cross-sectional view of the electronic device 90 of FIG. 17. The electronic device 90 is similar to the electronic device 10 in the first embodiment. In the ninth embodiment, a color of an adhesive layer 968 is different from a color of a first border portion 962 of the electronic device 90, to improve a visibility of through holes 965. Further, the through holes 965*a* for transmitting sound and the through holes 965*d* for dissipating heat each can be arranged to form a predetermined pattern such as a logo of the electronic device 90. The predetermined pattern can include characters. For example, as shown in FIG. 17, the through holes 965*a* can be arranged to form a pattern of "XXX" and the through holes 965*d* can be arranged to form a pattern of "O". It is understood that, the through holes 165*a* and the through holes 165*d* can be arranged to form other patterns according to requirements.

In this ninth embodiment, the through holes 965*d* can serve as decoration holes for the electronic device 90. The electronic device 90 further includes an illumination component located to correspond to and illuminate the through holes 965*d*.

Figure 19:
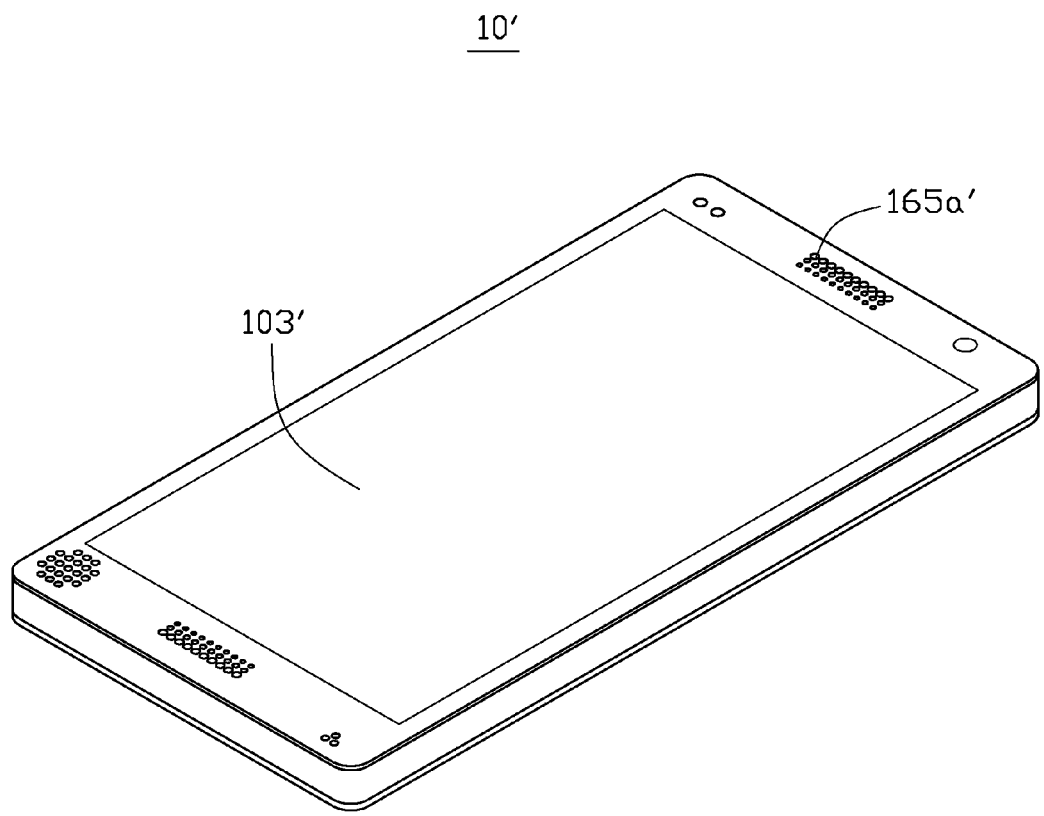
FIG. 19 is an isometric view of an electronic device according to a tenth embodiment.

FIG. 19 illustrates an isometric and schematic view of an electronic device 10' according to a tenth embodiment. The electronic device 10' is similar to the electronic device 10 in the first embodiment, except that through holes 165*a'* located at a same side of a display area 103' can have different diameters. In the tenth embodiment, the diameters of the through holes 165*a'* gradually increase along a direction away from the display area 103' while a distance between centers of each two adjacent through holes 165*a'* is not changed.

Figure 20:
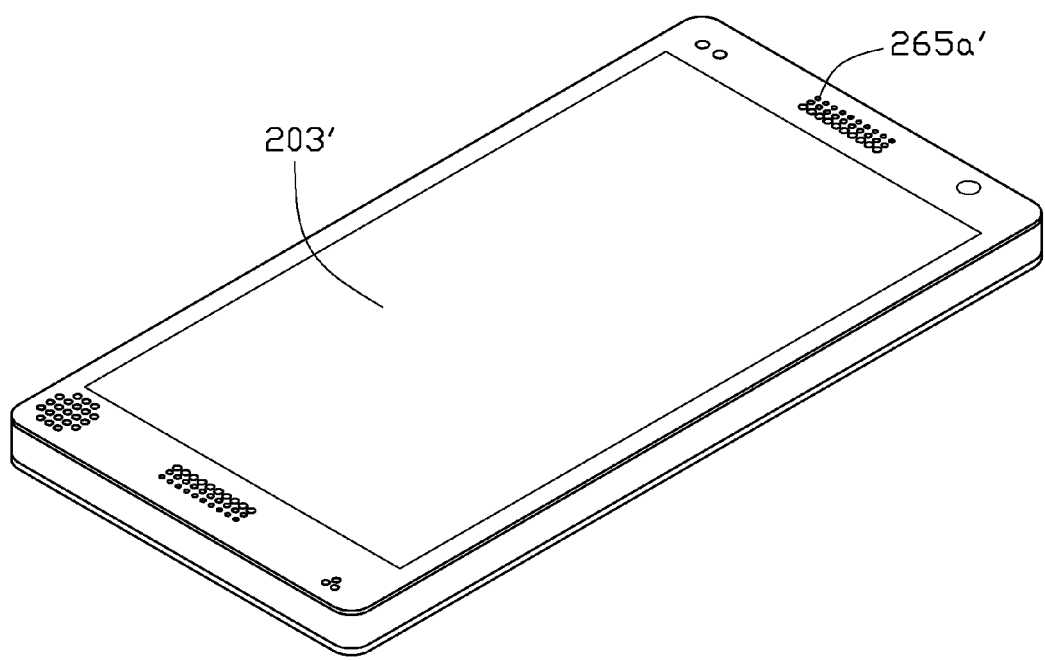
FIG. 20 is an isometric view of an electronic device according to a eleventh embodiment.

FIG. 20 illustrates an isometric view of an electronic device 20' according to a eleventh embodiment. The electronic device 20' is similar to the electronic device 10' in the tenth embodiment. Through holes 265*a'* located at a same side of a display area 203' can have different diameters. In this eleventh embodiment, the diameters of the through holes 265*a'* gradually decrease along a direction away from the display area 103' while a distance between centers of each two adjacent through holes 265*a'* is not changed.

Figure 21:
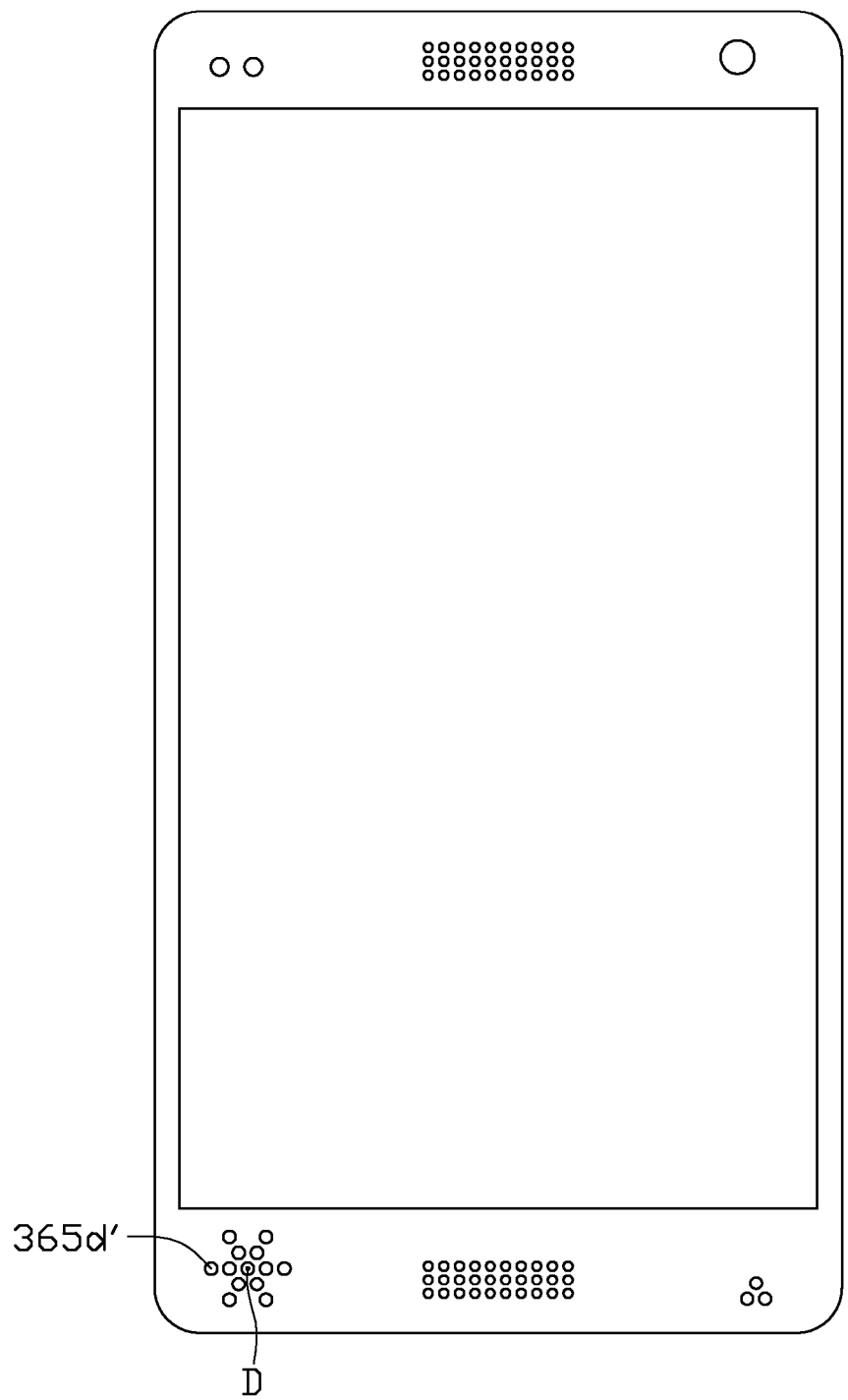
FIG. 21 is a plan view of an electronic device according to a twelfth embodiment.

FIG. 21 is a plan view of an electronic device 30' according to a twelfth embodiment. The electronic device 30' is similar to the electronic device 10 in the first embodiment. In the twelfth embodiment, through holes 365*d'* at a bottom-left side of a display area of the electronic device 30' are arranged in a radial range centered at a predetermined virtual point D. The through holes 365*d'* can have the same diameter. The through holes 365*d'* are spaced at uniform intervals.

Figure 22:
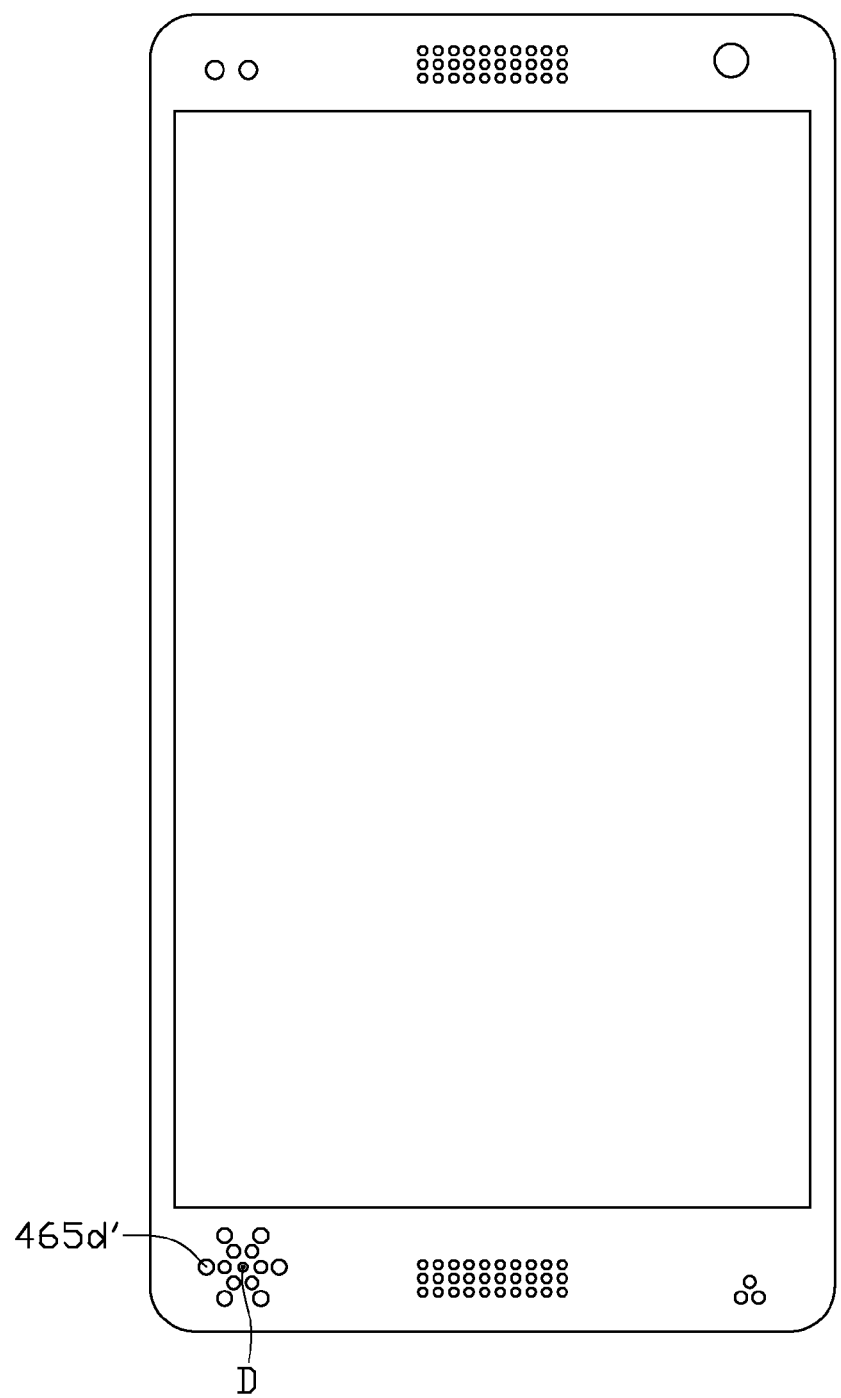
FIG. 22 is a plan view of an electronic device according to a thirteenth embodiment.

FIG. 22 is a plan view of an electronic device 40' according to a thirteenth embodiment. The electronic device 40' is similar to the electronic device 30' in the twelfth embodiment, except that diameters of through holes 465*d'* of the electronic device 40' gradually ascend along a direction away from the virtual point D.

Figure 23:
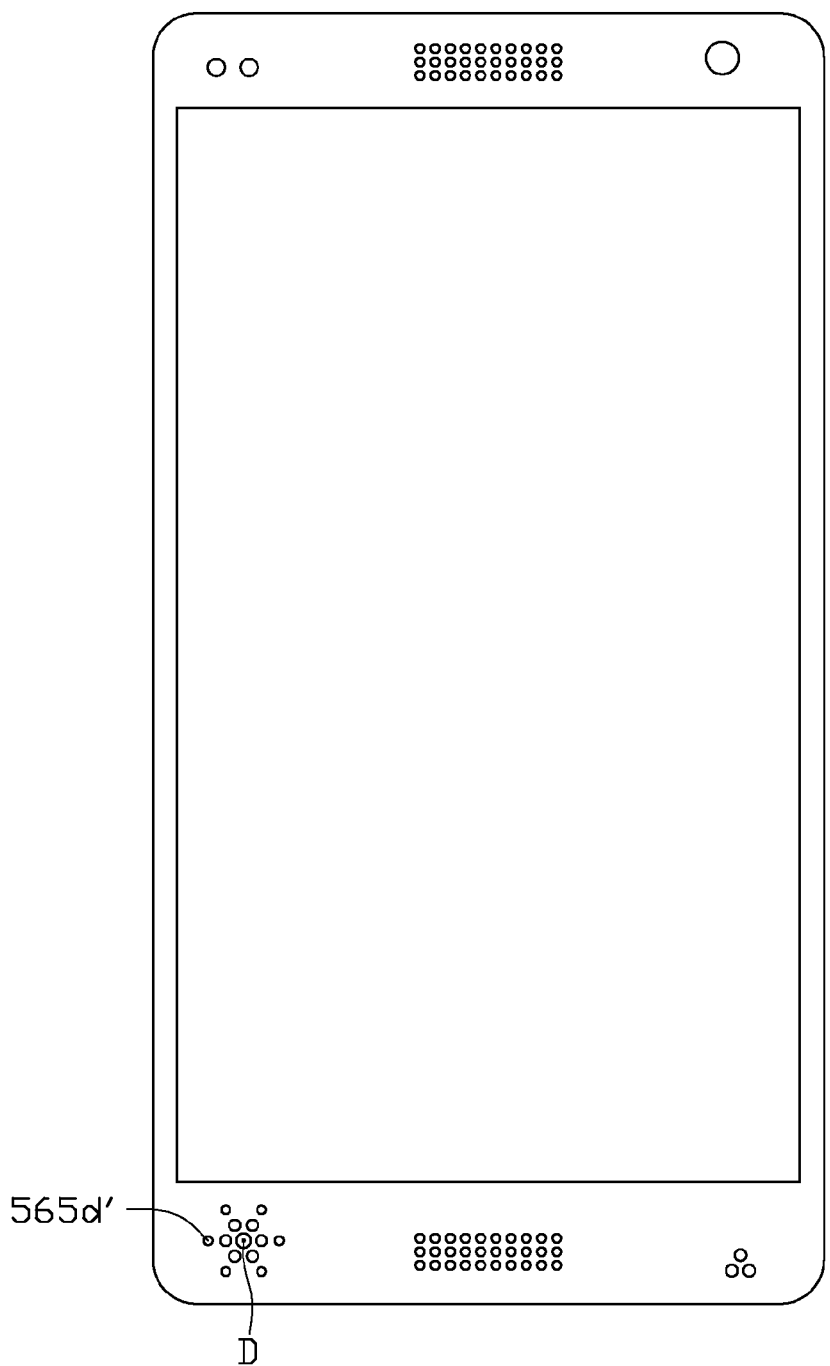
FIG. 23 is a plan view of an electronic device according to a fourteenth embodiment.

FIG. 23 is a plan view of an electronic device 50' according to a fourteenth embodiment. The electronic device 50' is similar to the electronic device 30' in the twelfth embodiment, except that diameters of through holes 565*d'* of the electronic device 50' gradually descend along a direction away from the virtual point D.

Figure 24:
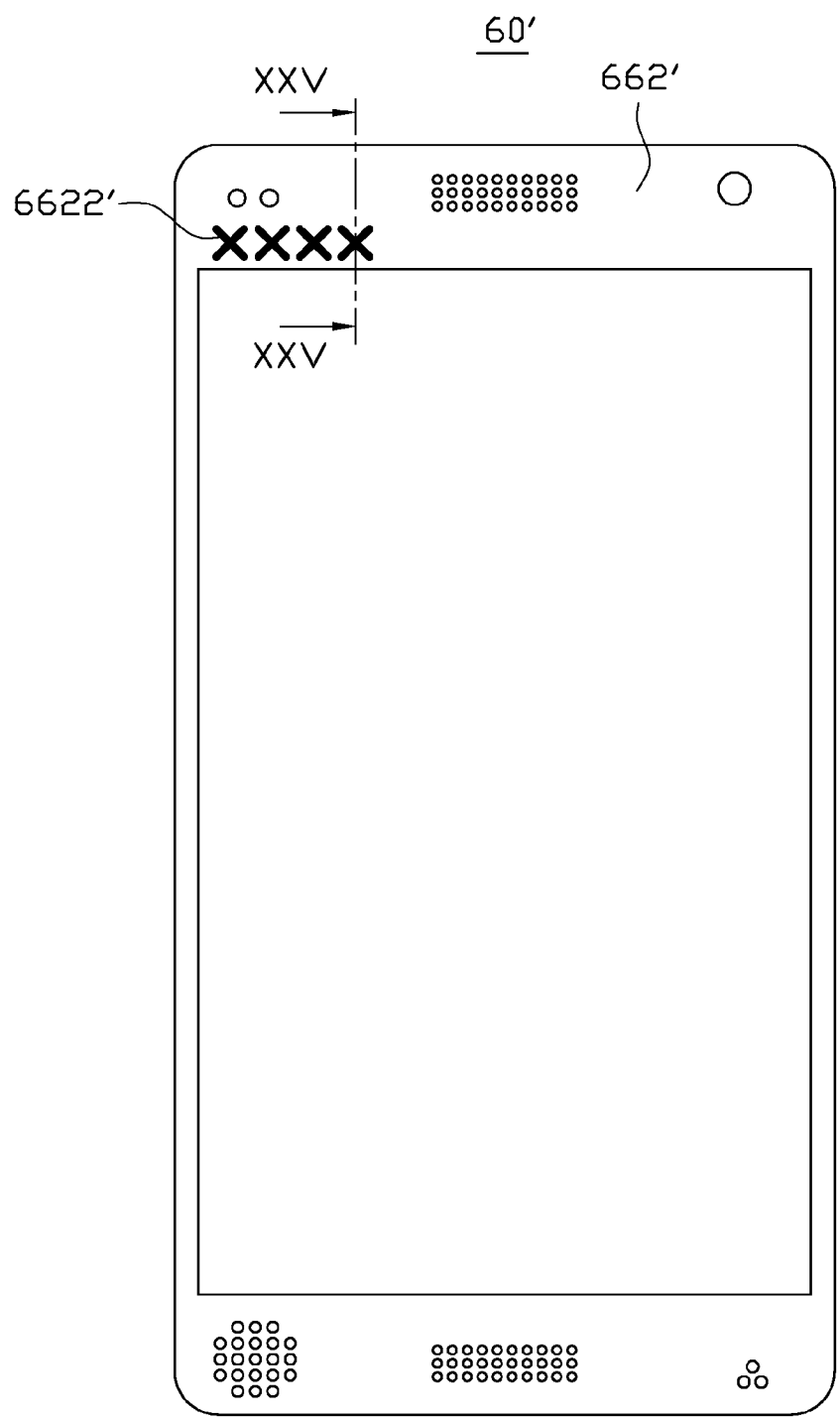
FIG. 24 is a plan view of an electronic device according to a fifteenth embodiment.
Figure 25:
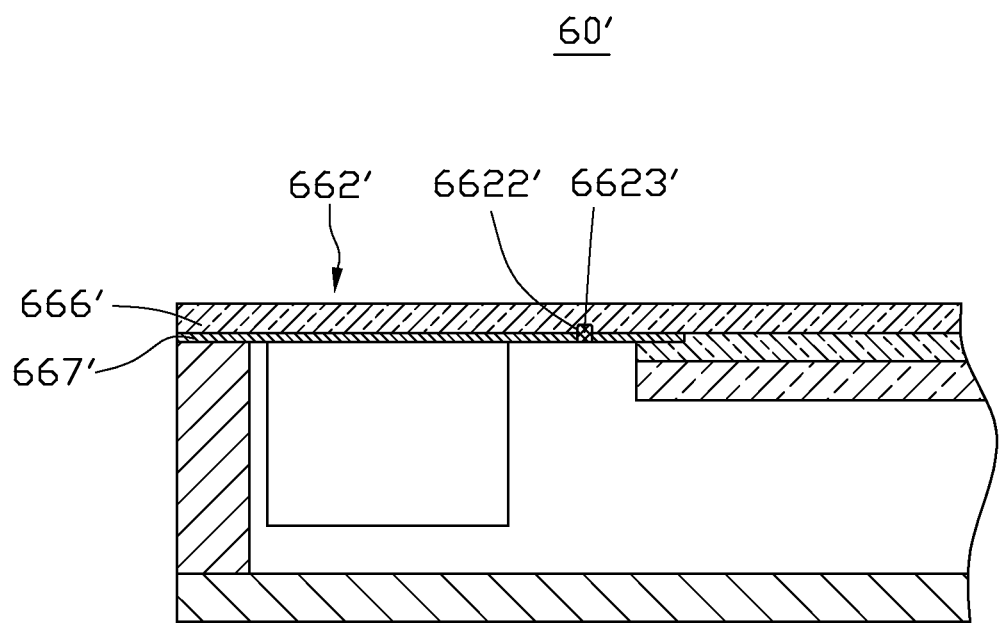
FIG. 25 is a cross-sectional view of FIG. 24 taken along line XXV-XXV.

Referring to FIG. 24-25, FIG. 24 is a plan view of an electronic device 60' according to a fifteenth embodiment, and FIG. 25 is a cross-sectional view of FIG. 24 taken along line XXV-XXV. The electronic device 60' is similar to the electronic device 10 in the first embodiment, except that a transparent substrate 66' of a border portion 662' defines at least one groove 6622'. A patterned adhesive layer 6623' is formed on the at least one groove 6622' to form a pattern on a surface of the border portion 662'. For example, as shown in FIG. 24, the pattern can be "XXXX". The pattern can also be a logo.

The at least on groove 6622' can be formed using a laser device. A depth of the at least one groove 6622' can be 0.1 millimeter to 2 millimeters. Preferably, the depth of the at least one groove 6622' is one-tenth of a thickness of the transparent substrate 666'. In at least one embodiment, the patterned adhesive layer 6623' can be made of an ink. A color of the patterned adhesive layer 6623' is different from a color of a shielding layer 965 on the transparent substrate 666'. In one example, the color of the shielding layer 667' can be black or white while the color of the patterned adhesive layer 6623' can be red. A thickness of the adhesive layer can be 0.01 millimeter to 1 millimeter, such as 0.05 millimeters.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A cover for an electronic device comprising:
a transparent portion defining a display area of the electronic device; and
a non-transparent portion defining a non-display area of the electronic device beside the display area, wherein the non-transparent portion comprises a transparent substrate integrated with the transparent portion, and the transparent substrate defines a plurality of through holes; the transparent substrate further comprises an adhesive layer adhered to an inner wall of each of at least one of the through holes; a color of the adhesive layer is the same as the non-transparent portion.

2. The cover as claimed in claim 1, wherein the transparent substrate further comprises a shield layer formed on a surface of the transparent substrate, the shielding layer and the adhesive layer are formed using the same material in a same manufacturing process.

3. The cover as claimed in claim 1, wherein the transparent substrate further comprises a shield layer formed on a surface of the transparent substrate, the shielding layer has the same color as the adhesive layer to decrease a visibility of the at least one through holes.

4. The cover as claimed in claim 1, wherein the transparent substrate further comprises a shield layer formed on a surface of the transparent substrate, a color of the shielding layer is different from a color of the adhesive layer to improve a visibility of the at least one through holes.

5. The cover as claimed in claim 1, wherein the plurality of through holes comprise a plurality of circular sound output holes to output sound output from the electronic device.

6. The cover as claimed in claim 5, wherein a distance between two centers of each adjacent sound output holes is 0.2 millimeters to 2 millimeters.

7. The cover as claimed in claim 1, wherein each of the each of the through holes is circular, the plurality of through holes are distributed at a same side of the display area, and diameters of the through holes descend along a direction away from the display area.

8. The cover as claimed in claim 1, wherein the transparent substrate defines a groove at an inner surface, and a patterned adhesive layer is formed on the groove.

9. An electronic device comprising:
   a cover comprising:
      a transparent portion defining a display area of the electronic device; and
      a non-transparent portion defining a non-transparent area of the electronic device beside the display area, the non-transparent portion comprising a transparent substrate integrated with the transparent portion, the transparent substrate defining a plurality of through holes; the transparent substrate further comprises an adhesive layer adhered to an inner wall of each of at least one of the through holes; a color of the adhesive layer is the same as the non-transparent portion.

10. The electronic device as claimed in claim 9, further comprising a logo formed by the plurality of through holes.

11. The electronic device as claimed in claim 9, wherein the transparent substrate further comprises a shield layer formed on a surface of the transparent substrate, the shielding layer and the adhesive layer are formed using the same material in a same manufacturing process.

12. The cover as claimed in claim 9, wherein the transparent substrate defines a groove at an inner surface, and a patterned adhesive layer is formed on the groove.

13. The electronic device as claimed in claim 9, wherein the electronic device further comprises at least one microphone, at least one of the through holes is located corresponding to the at least one microphone and configured to transmit external sound to the at least one microphone.

14. The electronic device as claimed in claim 9, wherein through holes comprise at least one heat dissipation hole to dissipate heat produced by the electronic device.

15. The electronic device as claimed in claim 9, wherein the electronic device further comprises at least on illumination component located near an inner side of the cover corresponding to the through holes to illuminate the through holes.

16. A method for manufacturing a cover for an electronic device, comprising:
   providing a cover base having a transparent portion and a non-transparent portion beside the transparent portion, the non-transparent portion comprising a transparent substrate; and
   forming a plurality of through holes on the transparent substrate;
   forming an adhesive layer in an inner wall of each of at least one of the through holes; and
   forming a shielding layer on a surface of the transparent substrate corresponding to the plurality of through holes, wherein the shielding layer has a same color as the adhesive layer.

17. The method as claimed in claim 16, wherein the step of forming an adhesive layer in an inner wall of each of at least one of the through holes comprises:
   filling adhesive material into each of the at least one of the through holes; and
   removing a portion of the adhesive material from each of the at least one of the through holes.

* * * * *